US009176284B2

(12) United States Patent
Megason et al.

(10) Patent No.: US 9,176,284 B2
(45) Date of Patent: Nov. 3, 2015

(54) OPTICAL BLIND-MATE CONNECTOR

(75) Inventors: George D. Megason, Spring, TX (US); Kevin B. Leigh, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/367,442

(22) PCT Filed: Feb. 24, 2012

(86) PCT No.: PCT/US2012/026504
§ 371 (c)(1),
(2), (4) Date: Jun. 20, 2014

(87) PCT Pub. No.: WO2013/126068
PCT Pub. Date: Aug. 29, 2013

(65) Prior Publication Data
US 2014/0334779 A1 Nov. 13, 2014

(51) Int. Cl.
*G02B 6/38* (2006.01)
*G02B 6/36* (2006.01)

(52) U.S. Cl.
CPC .............. *G02B 6/381* (2013.01); *G02B 6/3825* (2013.01); *G02B 6/3831* (2013.01); *G02B 6/3849* (2013.01); *G02B 6/3882* (2013.01); *G02B 6/3628* (2013.01); *G02B 6/3874* (2013.01); *G02B 6/3897* (2013.01)

(58) Field of Classification Search
CPC ..... G02B 6/831; G02B 6/3882; G02B 3/3849
See application file for complete search history.

(56) References Cited

U.S. PATENT DOCUMENTS

| | | | |
|---|---|---|---|
| 6,174,178 | B1 | 1/2001 | Reinhold |
| 6,302,592 | B1 | 10/2001 | Zullig |
| 6,419,399 | B1 | 7/2002 | Loder et al. |
| 6,425,694 | B1 | 7/2002 | Szilagyi et al. |
| 6,789,950 | B1 | 9/2004 | Loder et al. |
| 7,244,066 | B2 | 7/2007 | Theuerkorn |
| 7,980,768 | B2 | 7/2011 | Smith et al. |

(Continued)

FOREIGN PATENT DOCUMENTS

| | | |
|---|---|---|
| CN | 1193251 | 3/2005 |
| JP | 2002048941 | 2/2002 |

(Continued)

OTHER PUBLICATIONS

Fiber Optic Products, (Research Paper), Retrieved Jun. 20, 2014, 27 Pages, http://www.molex.com/catalog/web_catalog/pdfs/Q.pdf>.

(Continued)

*Primary Examiner* — Jerry Rahll
(74) *Attorney, Agent, or Firm* — Brooks, Cameron & Huebsch, PLLC

(57) ABSTRACT

An optical blind-mate connector can include a housing that holds a ferrule block, a carrier coupled to the housing, a reversibly retractable sleeve including a sleeve tab extending therefrom, to receive a force to transition the reversibly retractable sleeve from an extended position to a retracted position, and a door coupled to the reversibly retractable sleeve, the door having a closed position and an open position, wherein in the extended position the door is in the closed position to cover a portion of the ferrule block and in the retracted position the door is in the open position to uncover the portion of the ferrule block.

13 Claims, 4 Drawing Sheets

202
234-2
230-2
218-2
231
230-1
238-2
244
206-3
218-1
234-1
222-1
206-4
238-1
222-2

(56) References Cited

U.S. PATENT DOCUMENTS

| | | | |
|---|---|---|---|
| 2003/0044125 | A1 | 3/2003 | Kiani et al. |
| 2003/0081913 | A1 | 5/2003 | Zhu et al. |
| 2004/0240827 | A1 | 12/2004 | Daoud et al. |
| 2010/0254667 | A1 | 10/2010 | He et al. |
| 2010/0272404 | A1 | 10/2010 | He et al. |
| 2011/0268408 | A1 | 11/2011 | Giraud et al. |

FOREIGN PATENT DOCUMENTS

| | | |
|---|---|---|
| JP | 2007134227 | 5/2007 |
| TW | 500230 | 8/2002 |

OTHER PUBLICATIONS

International Searching Authority, The International Search Report and the Written Opinion, Feb. 26, 2013, 10 Pages.

OPTICAL BLIND-MATE CONNECTOR

BACKGROUND

Optical input/output may be used to transmit data between system components. For some applications, optical input/output may provide greater bandwidth and/or lower electromagnetic interference than other types of input/outputs. Optical fibers may be employed for optical input/output. For some applications, optical fibers may be coupled, to other optical fibers and/or system components by an optical connector.

DETAILED DESCRIPTION

Figure 1A:
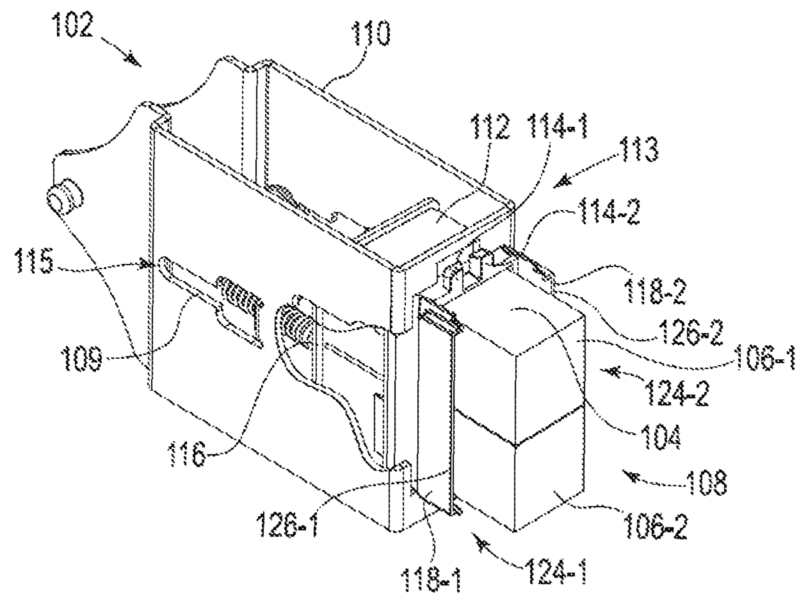
FIG. 1A illustrates a perspective view of an example of an optical blind-mate connector having a reversibly retractable sleeve in a retracted position.

Optical blind-mate connectors and optical blind-mate connector systems are described herein. As an example, an optical blind-mate connector may include a housing that holds a ferrule block, a carrier coupled to the housing, a reversibly retractable sleeve including a sleeve tab extending therefrom, and a door coupled to the reversibly retractable sleeve.

Optical Connectors may be employed to interconnect network elements. Mechanically damaged and/or contaminated optical connectors may reduce performance of one or more network elements or even an entire network. Therefore, it is desirable to reduce mechanical damage and/or contamination to optical connectors.

Further, reduced performance of one or more network elements or even an entire network may result from a misalignment of an optical cable to another optical cable. For example, misalignment may occur during the mating of optical cables or may be caused by an environmental factor, such as a shock or vibration. Therefore, it is desirable to reduce misalignment of an optical cable to another optical cable.

Some examples of the present disclosure may help to reduce mechanical damage and/or contamination that may be incurred by other optical connectors. Additionally, some examples of the present disclosure may help to reduce misalignment of on optical cable to another optical cable, which may occur with other connectors, that may occur by mating or an environmental factor.

In the following detailed description of the present disclosure, reference is made to the accompanying drawings that form a part hereof, and in which is shown by way of illustration how some examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1A, and a similar element may be referenced as 202 in FIG. 2A. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1A illustrates a perspective view of an example of an optical blind-mate connector 102 having a reversibly retractable sleeve in a retracted position. The optical blind-mate connector 102 can include a housing 104 that holds a ferrule block 106-1. The housing 104 can include plurality of ferrule blocks, e.g., ferrule block 106-1 and ferrule block 106-2. The housing 104 can be plastic or other materials appropriate for blind-mate and ferrule mounting tolerances. The optical blind-mate connector 102 may be utilized for high density applications. For example, the optical blind-mate connector 102 may be employed in parallel optics applications, e.g., where data is simultaneously transmitted and received over multiple optical fibers.

A ferrule block, e.g., 106-1 and/or 106-2, may include an array of ferrules, where each ferrule may hold a plurality of optical fibers. Some examples of the present disclosure provide that the array of ferrules may include 4 ferrules, 6 ferrules, 8 ferrules, or 16 ferrules, among other numbers of ferrules. Some examples of the present disclosure provide that each ferrule may hold 8 optical fibers, 12 optical fibers, or 16 optical fibers, among other numbers of optical fibers.

The ferrule block may include a surface 108, representing a mating end face of the arrays of ferrules. The surface 108 may provide an optical interface, e.g., for mating with another optical blind-mate connector, for the optical blind-mate connector 102. Some examples of the present disclosure provide that the surface 108 is rectangular, e.g., as shown in FIG. 1A; however the surface 108 may include other shapes depending on the number of ferrules.

The optical blind-mate connector 102 can include a carrier 110. For example, the carrier 110 can be coupled to the housing 104. Some examples of the present disclosure provide that a portion of housing 104 extends from the carrier 110. The carrier 110 can be sheet metal, plastic, and/or other materials. The carrier 110 can include a surface 109 that defines a glide slot 115, discussed further herein. As mentioned, the optical blind-mate connector 102 can include a reversibly retractable sleeve 112. FIG. 1A shows the reversibly retractable sleeve 112 in a retracted position 113, as discussed further herein.

The optical blind-mate connector 102 can include a first door 118-1 and/or a second door 118-2. The first door 118-1 and/or the second door 118-2 can each have an open position 124-1, 124-2, as shown in FIG. 1A. The first door 118-1 and/or the second door 118-2 are in the open position 124-1, 124-2 when the reversibly retractable sleeve 112 is in the retracted position 113. The first door 118-1 and/or the second door 118-2 can uncover, e.g., expose, a portion of the ferrule block 106, for example, when the doors are in the open position 124-1, 124-2. In the open position 124-1, 124-2 the surface 108 of ferrule block 106 is uncovered such that the optical blind-mate connector 102 can be mated, e.g., coupled, to another device, such as another optical blind-mate connector. The first door 118-1 and/or the second door 118-2 can transition to the open position 124-1, 124-2, for example, as the housing 104 contacts the first door 118-1 and/or the second door 118-2 due to the reversibly retractable sleeve 112 transitioning to the retracted position 113.

The first door 118-1 and the second door 118-2 can each respectively include a distal portion 126-1, 126-2. The distal portions 126-1, 126-2 can each respectively rotate away from the ferrule blocks 106-1, 106-2 as the reversibly retractable sleeve 112 transitions from the extended position 111 towards the retracted position 113, e.g., as the first door 118-1 and the second door 118-2 are transitioning toward the open position 124-1, 124-2. The rotation away from the ferrule blocks 106-1, 106-2 helps to reduce contamination to the ferrule blocks 106-1, 106-2 by rotating dust and/or other contaminants away from the ferrule blocks 106-1, 106-2, as opposed to other doors that, for example, rotate inwards toward a ferrule block.

Figure 1B:
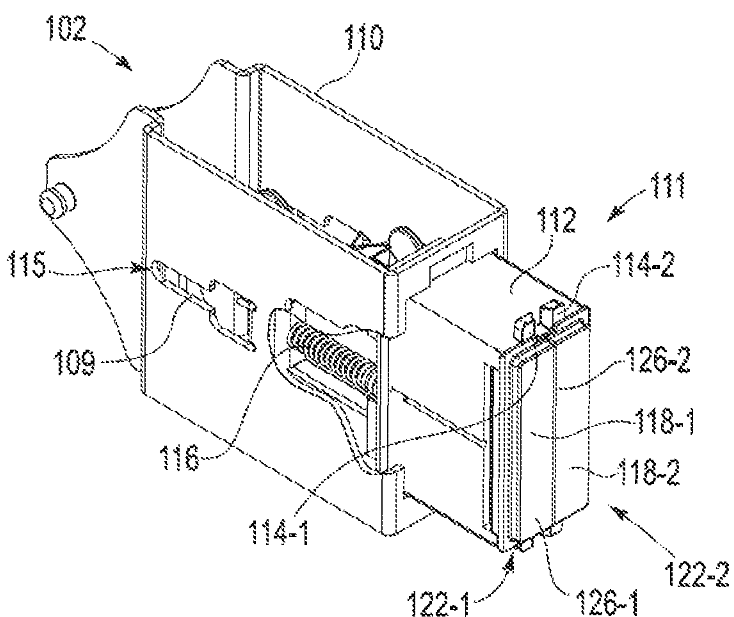
FIG. 1B illustrates a perspective view of the example of the optical blind-mate connector illustrated in FIG. 1A having the reversibly retractable sleeve in an extended position.

FIG. 1B illustrates a perspective view of the example of the optical blind-mate connector 102 illustrated in FIG. 1A having the reversibly retractable sleeve in an extended position. As shown in FIG. 18, the reversibly retractable sleeve 112 has an extended position 111. In the extended position 111 the reversibly retractable sleeve 112 surrounds the portion of the housing, e.g., the housing 104 illustrated in FIG. 1A, that extends from the carrier 110. In the extended position 111 the reversibly retractable sleeve 112 helps to reduce mechanical damage to the housing and/or the ferrule block, e.g., ferrule blocks 106-1, 106-2 illustrated in FIG. 1A, that may be incurred by an optical connector not including the reversibly retractable sleeve 112. For example, the reversibly retractable sleeve 112 may absorb a portion of energy, e.g., a force, that may otherwise damage the housing 104 and/or the ferrule blocks 106-1, 106-2. Such forces may occur, for example, when the optical blind-mate connector 102 contacts another piece of equipment or servicing tool. The reversibly retractable sleeve 112 also protects the housing 104 when a backplane tray, as discussed further herein, is exposed, e.g., during assembly or servicing events. Additionally, in the extended position 111 the reversibly retractable sleeve 112 helps to reduce contamination to the housing 104 and/or the ferrule blocks 106-1, 106-2 by blocking out dust and/or other contaminants that may contaminate an optical connector.

Some examples of the present disclosure provide that the reversibly retractable sleeve 112 includes a sleeve tab 114-1. The reversibly retractable sleeve 112 can include a plurality of sleeve tabs, e.g., sleeve tab 114-1 and sleeve tab 114-2. As shown in FIG. 18, the sleeve tabs 114-1, 114-2 can extend from the reversibly retractable sleeve 112. The sleeve tabs 114-1, 114-2 can extend perpendicularly from a surface the reversibly retractable sleeve 112; however other configurations are possible. The sleeve tabs 114-1, 114-2 can receive a force, e.g., a pushing force applied to the sleeve tabs 114-1, 114-2 to transition the reversibly retractable sleeve 112 from the extended position 111 to the retracted position 113.

The optical blind-mate connector 102 can include a sleeve biasing member 116. The sleeve biasing member 116 can be a spring; however other sleeve biasing members 116 are possible. Some examples of the present disclosure provide that the sleeve biasing member 116 can bias the reversibly retractable sleeve 112 toward the extended position 111. For example, the sleeve biasing member 116 can be a spring that exerts a force, e.g., a spring force, on the reversibly retractable sleeve 112 in a direction towards the ferrule block 108 relative to the carrier 110.

The optical blind-mate connector 102 can include a first door 118-1 and/or a second door 118-2. Some examples of the present disclosure provide that the optical blind-mate connector 102 can include differing numbers of doors. For example, the optical blind-mate connector 102 can include one door, two doors, or four doors, among other numbers of doors. The first door 118-1 and/or the second door 118-2 can be coupled to the reversibly retractable sleeve 112. For example, the first door 118-1 and/or the second door 118-2 can be hingedly connected to the reversibly retractable sleeve 112.

The first door 118-1 and/or the second door 118-2 each have a closed position 122-1, 122-2, as shown in FIG. 1B. The first door 118-1 and/or the second door 118-2 are in the closed position 122-1, 122-2 when the reversibly retractable sleeve 112 is in the extended position 111. The first door 118-1 and/or the second door 118-2 can cover a portion of the ferrule block 106, e.g., when the doors are in the closed position 122-1, 122-2. Some examples of the present disclosure provide that the first door 118-1 and/or the second door 118-2 can cover the entire ferrule block 106 when the doors are in the closed position 122-1, 122-2. in the closed position 122-1, 122-2 the first door 118-1 and/or the second door 118-2 help to reduce mechanical damage to the ferrule block 106 that may be incurred by an optical connector not including the first door 118-1 and/or the second door 118-2. Additionally, in the closed position 122-1, 122-2 the first door 118-1 and/or the second door 118-2 help to reduce contamination to the ferrule block 106 by blocking out dust and/or other contaminants that may contaminate an optical connector not including the first door 118-1 and/or the second door 118-2.

The optical blind-mate connector 102 can include a door biasing member that biases the first door 118-1 and/or the second door 118-2 toward the closed position 122-1, 122-2. Some examples of the present disclosure provide that the optical blind-mate connector 102 can include differing numbers of door biasing members. For example, the optical blind-mate connector 102 can include one door biasing member, two door biasing members, or three door biasing members, among other numbers of door biasing members. A single door biasing member can bias a single door, e.g., the first door 118-1 or the second door 118-2, toward the closed position 122-1, 122-2; or a single door biasing member can bias multiple doors, e.g., the first door 118-1 and the second door 118-2, toward the closed position 122-1, 122-2. As an example, the door biasing member can be a spring, e.g., a torsion spring, that exerts a force or a torque on the first door 118-1 and/or the second door 118-2 to bias the first door 118-1 and/or the second door 118-2 toward the closed position 122-1, 122-2. Some examples of the present disclosure provide that a door biasing member hingedly connects the first door 118-1 to the reversibly retractable sleeve 112. Some examples of the present disclosure provide that a door biasing member hingedly connects the second door 118-2 to the reversibly retractable sleeve 112.

Figure 2A:
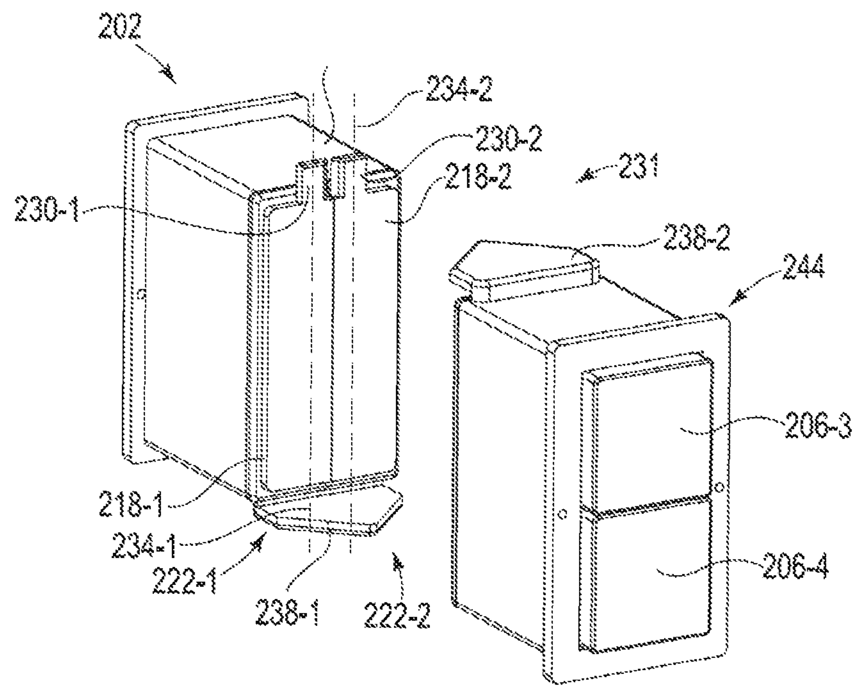
FIG. 2A illustrates a perspective view of an example of optical blind-mate connectors in an unmated position.

FIG. 2A illustrates a perspective view of an example of optical blind-mate connectors in an unmated position 231. A second optical blind-mate connector 244 is discussed further herein. As discussed, the optical blind-mate connector 202 can include the first door 218-1 and/or the second door 218-2. Some examples of the present disclosure provide that the first door 218-1 can include a door tab 230-1. The door tab 230-1 can extend from a surface the door 218-1, e.g., the door tab 230-1 can extend parallel to a longitudinal axis 234-1 of the door 218-1; however other configurations are possible. Some examples of the present disclosure provide that the second door 218-2 can include a door tab 230-2. The door tab 230-2 can extend from a surface the door 218-2, e.g., the door tab 230-2 can extend parallel to a longitudinal axis 234-2 of the door 218-2; however other configurations are possible. The door tabs 230-1, 230-2 can be differing shapes. For example, each of the door tabs 230-1, 230-2 may respectively include one or more polyhedron, sphere, cylinder, cone, and combinations thereof.

Some examples of the present disclosure provide that the first door 218-1 and/or the second door 218-2 can move laterally relative to the surface of the ferrule block, e.g., the first door 218-1 and/or the second door 218-2 can move perpendicularly relative to the longitudinal axis 234-1 of the door 218-1 and/or the longitudinal axis 234-2 of the door 218-2. Some examples of the present disclosure provide that the first door 218-1 and the second door 218-2 can move in opposite directions. For example, the first door 218-1 and the second door 218-2 can move away from one another when transitioning from the closed position 222-1, 222-2 to an open position, e.g., open positions 240-1, 240-2 as illustrated in FIG. 2B.

The optical blind-mate connector 202 can include an activation tab 238-1. Some examples of the present disclosure provide that the activation tab 238-1 can be coupled to the housing that holds the ferrule block or the reversibly retractable sleeve 212; however other configurations are possible. The activation tab 238-1 can extend from the housing perpendicularly relative to a surface of the ferrule block, e.g., the activation tab 238-1 can extend perpendicularly to the longitudinal axis 234-1 of the door 218-1 and/or the longitudinal axis 234-2 of the door 218-2. Some examples of the present disclosure provide that the activation tab 238-1 can be located transversely from the door tab 230-1, 230-2 relative to the surface of the ferrule block, e.g., surface 108 as shown in FIG. 1A; however other configurations are possible. The activation tab 238-1 can have differing shapes. For example, activation tab 238-1 may include one or more polyhedron, sphere, cylinder, cone, and combinations thereof.

Figure 2B:
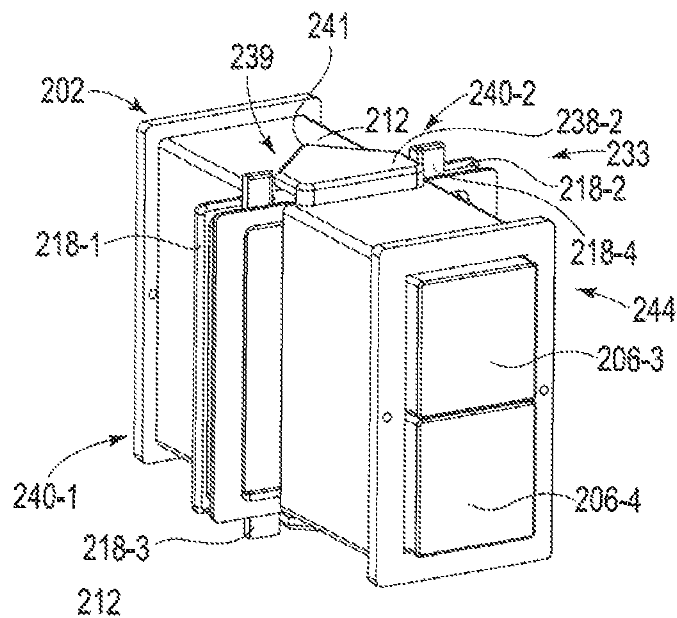
FIG. 2B illustrates a perspective view of the example of optical blind-mate connectors illustrated in FIG. 2A in a mated position.

FIG. 2B illustrates a perspective view of the example of optical blind-mate connectors illustrated in FIG. 2A in a mated position 233. As discussed, the door tab 230-1 and/or the door tab 230-2 may receive a force to transition first door 218-1 and the second door 218-2 from the closed positions, e.g., 222-1, 222-2 as illustrated in FIG. 2A, to the open positions 240-1, 240-2, such as when transitioning from the unmated position to the mated position 233. The force to transition first door 218-1 and the second door 218-2 from the closed positions to the open positions 240-1, 240-2 may be provided by an activation tab, e.g., an activation tab 238-2 of the second optical blind-mate connector 244. The activation tab 238-2 can have differing shapes. For example, activation tab 238-2 may include one or more polyhedron, sphere, cylinder, cone, and combinations thereof. When mating the optical blind-mate connector 202 and the second optical blind-mate connector 244, the activation tab 238-2 may contact the door tab 230-1 and the door tab 230-2 to provide a force that the first door 218-1 and the second door 218-2 from the closed positions to the open positions 240-1, 240-2.

As an example, the activation tab 238-2 may have a tapered shape, such that a distal portion 239 of the activation tab 238-2 includes a point 241. The point 241 can contact the door tab 230-1 and the door tab 230-2 to cause the door tabs 230-1, 230-2 to separate. For example, the point 241 can create and/or enhance an initial gap between the door tabs 230-1, 230-2 and thereafter a remaining portion of the activation tab 238-2 having a greater width than the point 241 can further move the door tabs 230-1, 230-2 away from one another as the distance between the optical blind-mate connector 202 and the second optical blind-mate connector 244 is reduced, e.g. during mating.

Further, second optical blind-mate connector 244 can include a first door 218-3 and a second door 218-4. Similarly to the doors 218-1, 218-2 of the optical blind-mate connector 202, the first door 218-3 and a second door 218-4 of the second optical blind-mate connector 244 can each respectively include a door tab. The door tabs of the second optical blind-mate connector 244 can each move laterally when transitioning from a closed position to an open position. The door tabs of the second optical blind-mate connector 244 can each may receive a force to transition first door 218-3 and the second door 218-4 from the closed position to the open position. Some examples of the present disclosure provide that this force can be provided by the activation tab 238-1 of the optical blind-mate connector 202. The door tabs of the second optical blind-mate connector 244 can be differing shapes. For example, each of the door tabs of the second optical blind-mate connector 244 may respectively include one or more polyhedron, sphere, cylinder, cone, and combinations thereof. Optical fibers can be connected to the ferrule block, e.g., ferrule blocks 206-3, 206-4 as illustrated in FIGS. 2A and 2B.

Figure 3B:
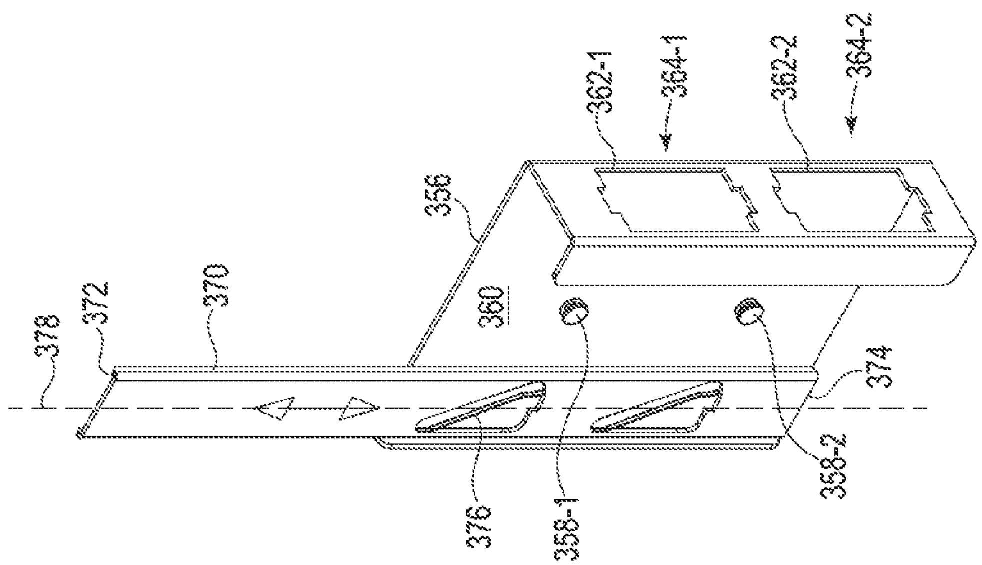
FIG. 3B illustrates a perspective view of an example of a backplane tray of the system illustrated in FIG. 3A.
Figure 3A:
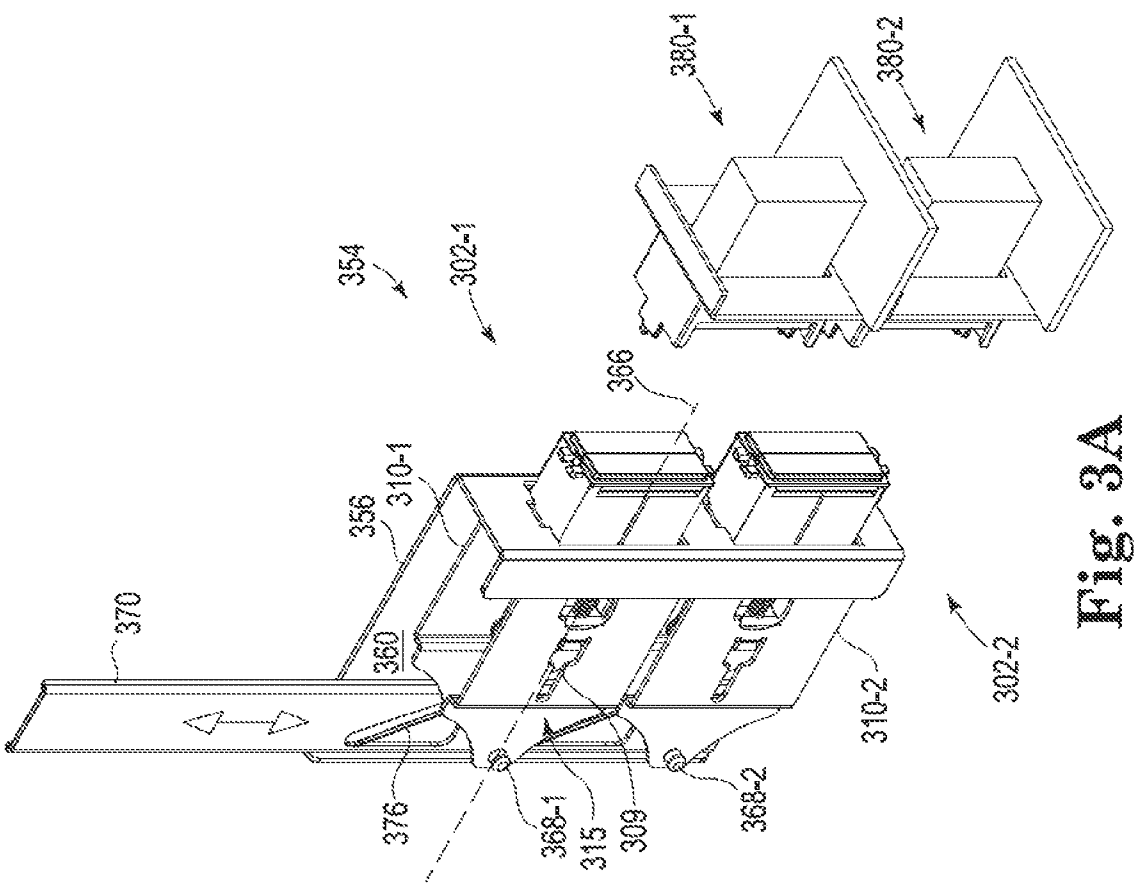
FIG. 3A illustrates a first perspective view of an example of an optical blind-mate connector system.

FIG. 3A illustrates a first perspective view of an example of an optical blind-mate connector system 354. The optical blind-mate connector system 354 includes a first optical blind-mate connector 302-1. Some examples of the present disclosure provide that the first optical blind-mate connector 302-1 can be a component of an optical backplane, e.g., the first optical blind-mate connector 302-1 can be a backplane-side connector.

FIG. 3A shows that the optical blind-mate connector system 354 can include two backplane-side connectors, e.g., optical blind-mate connectors 302-1, 302-2; however, the optical blind-mate connector system 354 can include other numbers of backplane-side connectors. Some examples of the present disclosure provide that the optical blind-mate connector system 354 can include 4 backplane-side connectors, 8 backplane-side connectors, 16 backplane-side connectors, or 32 backplane-side connectors, among other numbers of backplane-side connectors.

As shown in FIG. 3A, the backplane-side connectors 302-1 and 302-2 can be housed in a backplane tray 356. As shown in FIG. 3A, a portion of the first optical blind-mate connectors 302-1, 302-2 can extend from the backplane tray 356.

The glide slot 315 that is defined by the surface 309 that can receive one or more glide pins, e.g., glide pins shown in FIG. 3B. Some examples of the present disclosure provide that the carrier 310 can include a plurality of glide slots 315, e.g., the carrier 310 can include a glide slot 315 in surfaces that are parallel to a surface 360 of the backplane tray 356 when the optical blind-mate connectors 302-1, 302-2 are housed in the backplane tray 356. Some examples of the present disclosure provide that the carrier 310-1 can move back and forth in the direction of a longitudinal axis 366 of the carrier 310-1, e.g., the carrier 310-1 can move within the backplane tray 356 relative to a glide pin 358-1, as illustrated in FIG. 3B. While the carrier 310-1 can move, e.g., back and forth, within the backplane tray 356, the carrier can be subject to pressure from the longitudinal spring member that is associated with the backplane-side connector. For example, the longitudinal spring member may apply a pressure to the carrier 310-1 in the directions of the longitudinal axis 366 toward an opening, e.g., an opening 362-1 as shown in FIG. 3B.

As shown in FIG. 3A, the optical blind-mate connectors 302-1, 302-2 can include an engagement post 368-1, 368-2.

The engagement posts 368-1, 368-2 can protrude from a respective surface of the carriers 310-1, 310-2. Some examples of the present disclosure provide that one or more of the carriers, such as carrier 310-1 and/or carrier 310-2, can include a plurality of engagement posts 368, e.g., a carrier 310 can include an engagement post 368 protruding from surfaces that are parallel to the surface 360 of the backplane tray 356 when the optical blind-mate connectors 302-1, 302-2 are housed in the backplane tray 356. The engagement post 368 can be differing shapes. For example, engagement post 368 may include one or more polyhedron, sphere, cylinder, cone, and combinations thereof.

The optical blind-mate connector system 354 can include an elongate positioning member 370. The elongate positioning member 370 can be coupled to, e.g., moveably attached, to the backplane tray 356. The elongate positioning member 370 can include a spring member 376. Some examples of the present disclosure provide that the elongate positioning member 370 can include a plurality of spring members 376. For example, the number of spring members 376 may be equal to the number of the optical blind-mate connectors 302, where the number of the optical blind-mate connectors 302 is greater than one.

Some examples of the present disclosure provide that the spring member 376 includes a portion that is diagonal relative to a longitudinal axis 378 of the elongate positioning member 370. Some examples of the present disclosure provide that the spring member 376 is coupled to the engagement post 368 of the carrier 310. For example, in FIG. 3A the spring member 376 is coupled to an engagement post, which is hidden from view, of the carrier 310. Some examples of the present disclosure provide the each of the plurality of spring members 376 has a similar structure. However, some examples of the present disclosure provide the one or more of the plurality of spring members 376 has a differing structure than another of the plurality of spring members 376.

FIG. 3B illustrates a perspective view of an example of a backplane tray 356 of the system illustrated in FIG. 3A. The backplane tray 356 can include a number of glide pins 358-1, 358-2, e.g., as mentioned. The glide pins can be attached to a sideward surface 360 of the backplane tray 356. The glide pins can be differing shapes. For example, each of the glide pins may respectively include one or more polyhedron, sphere, cylinder, cone, and combinations thereof. The backplane tray 356 can include a number of surfaces 362-1, 362-2 that define one or more openings 364-1, 364-2. Each opening 364-1, 364-2 can receive a backplane-side connector, e.g., as illustrated in FIG. 3A.

The elongate positioning member 370 can include a first end 372 and a second end 374, as shown in FIG. 3B. As discussed the spring member 376 can include the portion that is diagonal relative to a longitudinal axis 378 of the elongate positioning member 370. Because the spring member 376 includes this portion, moving the elongate positioning member 370 in the direction of the first end 372, e.g., parallel to the longitudinal axis 378, moves a carrier, e.g., carriers 310-1, 310-2 as illustrated in FIG. 3A, toward an advanced position where an optical blind-mate connector, e.g., connectors 302-1, 302-2 as illustrated in FIG. 3A, is positioned to blind mate. Further, moving the elongate positioning member 370 in the direction of the second end 374, e.g., parallel to the longitudinal axis 378, moves a carrier toward a withdrawn position relative to the advanced position, e.g., moves the carrier away from an opening, e.g. openings 364-1, 364-2. The elongate positioning member 370 provides an advantage over other optical connector systems because with the elongate positioning member 370 multiple optical blind-mate connectors can be moved to an advanced position where each of the optical blind-mate connectors is positioned to blind mate. Some examples of the present disclosure provide that multiple optical blind-mate connectors, e.g. connectors 302-1, 302-2 as illustrated in FIG. 3A, can be moved simultaneously to the advanced position where each of the optical blind-mate connectors is positioned to blind mate. Some examples of the present disclosure provide that multiple optical blind-mate connectors, such as connectors 302-1, 302-2 as illustrated in FIG. 3A, can be moved in sequence, e.g., one optical blind-mate connector at a time, to the advanced position where each of the optical blind-mate connectors is positioned to blind mate. Moving multiple optical blind-mate connectors in sequence can help provide less force employed to move the connectors with the elongate positioning member 370.

Figure 3C:
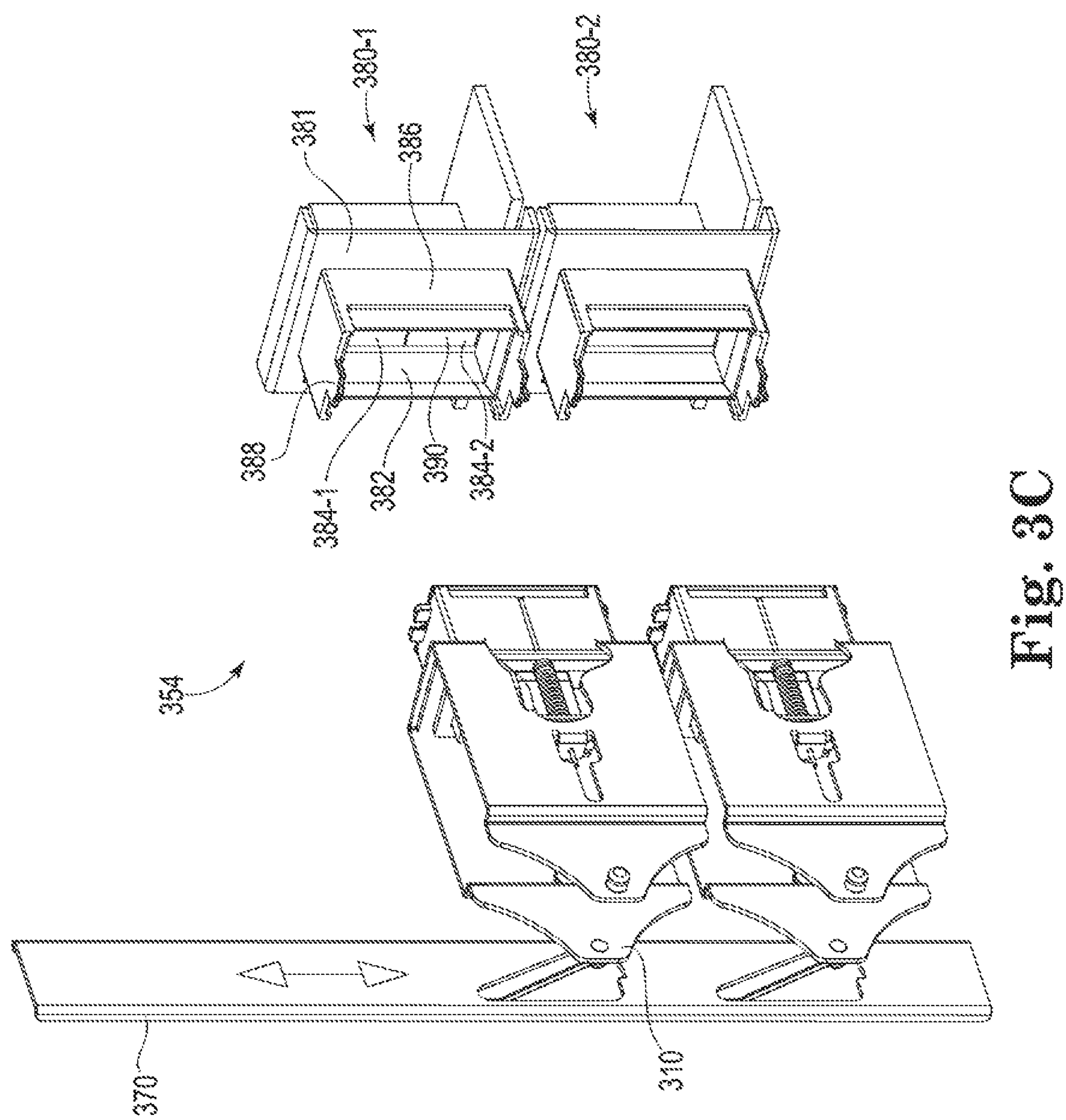
FIG. 3C illustrates a second perspective view of the example of optical blind-mate connector system illustrated in FIG. 3A.

FIG. 3C illustrates a second perspective view of the example of optical blind-mate connector system 354 illustrated in FIG. 3A. The optical blind-mate connector system 354 can include a second optical blind-mate connector 380. FIG. 3C shows that the optical blind-mate connector system 354 can include two blade-side connectors, e.g., second optical blind-mate connectors 380-1, 380-2; however, the optical blind-mate connector system 354 can include other numbers of blade-side connectors. Some examples of the present disclosure provide that the optical blind-mate connector system 354 can include 4 blade-side connectors, 8 blade-side connectors, 16 blade-side connectors, or 32 blade-side connectors, among other numbers of blade-side connectors. As used herein, blade may refer to a server, a storage device, or a switch, among other blades.

The second optical blind-mate connector 380 can include a second housing 382 that holds a second ferrule block 384-1, 384-2. As shown in FIG. 3C, the second housing 382 extends from a blade panel 381. The second ferrule block 384-1, 384-2 is compatible with, e.g., can be mated with, the first ferrule block, e.g. ferrule block 106-1, 106-2 as described herein.

The second optical blind-mate connector 380 can include a shroud 386. The shroud 386 can surround a portion of the second housing 382. Some examples of the present disclosure provide that the shroud 386 surrounds an entire portion of the second housing 382 that extends from the blade panel 381. The shroud 386 helps to reduce mechanical damage and contamination to the second housing 382 and the second ferrule block 384 that may be incurred by an optical connector not including the shroud 386.

The shroud 386 can include an activation tab 388 extending therefrom. Some examples of the present disclosure provide that the activation tab 388 can extend from the shroud 386 perpendicularly relative to a surface 390 of the second ferrule block 384 as shown in FIG. 3C; however other configurations are possible. The activation tab 388 can provide a force to transition the reversibly retractable sleeve of an optical blind-mate connector, e.g., optical blind-mate connector 302, from the extended position to the retracted position, as discussed herein. The activation tab 388 can be differing shapes. For example, activation tab 388 may include one or more polyhedron, sphere, cylinder, cone, and combinations thereof.

To mate the first optical blind-mate connector 302 and the second optical blind-mate connector 380 the second optical blind-mate connector 380 can be inserted into the first optical blind-mate connector 302. For proper mating, alignment of the second ferrule block with the first ferrule block may be useful. In other blind-mate systems, a blade side connector can be over inserted and result in misalignment of the ferrule blocks, when mating connectors. As discussed herein, the carrier 310 can move within the backplane tray 356 of the optical blind-mate connector system 354. Providing that the carrier 310 can move, e.g., back and forth, within the backplane tray 356 provides an advantage, as compared to other systems where the connector is not free to move back and forth within a backplane tray, in that the second optical blind-mate connector 380 can be over inserted and proper mating established.

Although specific examples have been illustrated and described herein, those of ordinary skill in the art will appreciate that an arrangement calculated to achieve the same results can be substituted for the specific embodiments shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the examples of the present disclosure includes other applications in which the above structures are used. Therefore, the scope of examples of the present disclosure should be determined with reference to the appended claims, along with the full range of equivalents to which such claims are entitled.

In the foregoing Detailed Description, some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

What is claimed:

1. An optical blind-mate connector, comprising:
a housing that holds a ferrule block;
a carrier coupled to the housing, wherein a portion of the housing extends from the carrier;
a reversibly retractable sleeve including a sleeve tab extending therefrom, to receive a force to transition the reversibly retractable sleeve from an extended position to a retracted position, wherein in the extended position the reversibly retractable sleeve surrounds the portion of the housing that extends from the carrier; and
a door coupled to the reversibly retractable sleeve, the door having a closed position and an open position, wherein in the extended position the door is in the closed position to cover a portion of the ferrule block and in the retracted position the door is in the open position to uncover the portion of the ferrule block.

2. The connector of claim 1, wherein the door includes a distal portion that rotates away from the ferrule block as the reversibly retractable sleeve transitions from the extended position towards the retracted position.

3. The connector of claim 1, further including a door biasing member that biases the door toward the closed position.

4. The connector of claim 1, further including a sleeve biasing member that biases the reversibly retractable sleeve toward the extended position.

5. The connector of claim 1, wherein the carrier includes a surface that defines a glide slot that receives a glide pin that is attached to a backplane tray.

6. The connector of claim 5, wherein the carrier moves within the backplane tray relative to the glide pin.

7. An optical blind-mate connector, comprising:
a housing that holds a ferrule block;
an activation tab that extends from the housing perpendicularly relative to a surface of the ferrule block, wherein the activation tab is configured to provide a force to transition a second optical blind-mate connector's door from a closed position to an open position; and
a door coupled to the housing, the door including a door tab extending therefrom to receive a force to transition the door from a closed position to an open position, wherein the door moves laterally relative to a surface of the ferrule block and in the closed position the door covers a portion of the ferrule block and in the open position the door uncovers the portion of the ferrule block.

8. The connector of claim 7, wherein further including a second door coupled to the housing, the second door including a second door tab extending therefrom to receive a force to transition the second door from a closed position to an open position, wherein the second door moves laterally relative to a surface of the ferrule block and the lateral movement of the second door is in a direction that is opposite the lateral movement of the door.

9. The connector of claim 7, wherein the activation tab is located transversely from the door tab relative to the surface of the ferrule block.

10. An optical blind-mate connector system, comprising:
a first optical blind-mate connector including:
a first housing that holds a first ferrule block;
a carrier coupled to the first housing, wherein a portion of the first housing extends from the carrier;
a reversibly retractable sleeve including a sleeve tab extending therefrom to receive a force to transition the reversibly retractable sleeve from an extended position to a retracted position; and
a door coupled to the reversibly retractable sleeve, wherein in the extended position the door is in a closed position and in the retracted position the door is in an open position; and
a second optical blind-mate connector including:
a second housing that holds a second ferrule block;
a shroud that surrounds a portion of the second housing, wherein the shroud includes an activation tab extending therefrom to provide the force to transition the reversibly retractable sleeve from the extended position to the retracted position.

11. The system of claim 10, wherein the carrier includes a surface that defines a glide slot, wherein the glide slot receives a glide pin that is coupled to a backplane tray and the carrier moves within the backplane tray relative to the glide pin.

12. The system of claim 11, further including:
an engagement post that protrudes from a surface of the carrier and an elongate positioning member having a first end, a second end, and a spring member that is coupled to the engagement post such that moving the elongate positioning member in the direction of the first end moves the carrier toward an advanced position to blind mate the first optical blind-mate connector and the second optical blind-mate connector and moving the elongate positioning member in the direction of the second end moves the carrier toward a withdrawn position relative to the advanced position.

13. The system of claim 12, wherein the elongate positioning member is coupled to the backplane tray.

* * * * *